United States Patent [19]

Harry

[11] Patent Number: 4,631,452

[45] Date of Patent: Dec. 23, 1986

[54] APPARATUS AND METHOD FOR GENERATING A PLURALITY OF ELECTRIC DISCHARGES

[75] Inventor: John E. Harry, Oakham, England

[73] Assignee: Loughborough Consultants Limited, Loughborough, England

[21] Appl. No.: 425,752

[22] Filed: Sep. 28, 1982

[51] Int. Cl.[4] .................... H01J 11/04; H01J 13/48; H01J 15/04; H01J 17/36; H05B 37/00

[52] U.S. Cl. .................... 315/334; 315/260; 315/263; 372/85; 313/302

[58] Field of Search ............... 315/260, 263, 265, 266, 315/334; 313/302, 304; 372/85

[56] References Cited

U.S. PATENT DOCUMENTS

| | | | |
|---|---|---|---|
| 2,034,572 | 3/1936 | Found | 315/265 X |
| 2,116,702 | 5/1938 | Kern et al. | 315/266 X |
| 2,491,178 | 12/1949 | Hawkins | 315/334 X |
| 3,122,672 | 2/1964 | Sheer | 315/334 X |
| 3,304,457 | 2/1967 | Mastrup | 315/334 |
| 3,611,015 | 5/1971 | Kim | 315/265 |
| 3,635,537 | 1/1972 | Miller et al. | 315/334 |
| 3,801,853 | 4/1974 | Giannini | 313/267 |
| 4,080,578 | 3/1978 | Farish et al. | 372/85 |
| 4,259,617 | 3/1981 | Godard | 315/334 |

FOREIGN PATENT DOCUMENTS

| | | | |
|---|---|---|---|
| 0943262 | 3/1974 | Canada | 315/334 |
| 1025293 | 4/1966 | United Kingdom | 315/265 |

OTHER PUBLICATIONS

"$CO_2$ Transverse-Discharge Lasers", R. Freiberg & P. Clark, IEEE Journal of Quantum Electronics, vol. QE-6, No. 2, Feb. 1970.

Primary Examiner—Saxfield Chatmon
Attorney, Agent, or Firm—Kane, Dalsimer, Kane, Sullivan & Kurucz

[57] ABSTRACT

An electric discharge apparatus, for example a gas laser or discharge lamp, includes first and second electrodes defining a first discharge path and third and fourth electrodes defining a second discharge path alongside the first. A respective impedance is associated with any electrical connection between electrodes. The electrodes are electrically arranged such that either the current flow of a discharge along the first path is so different from the current flow of a discharge along the second path that, overall, the discharges repel one another, or stable electric discharges which coalesce are generated between respective electrodes of the first and second sets.

A multi-electrode plasma torch is also provided comprising an electrode holder from which a plurality of electrodes project and a pilot electrode common to more than one of the electrodes.

14 Claims, 19 Drawing Figures

FIG. II.

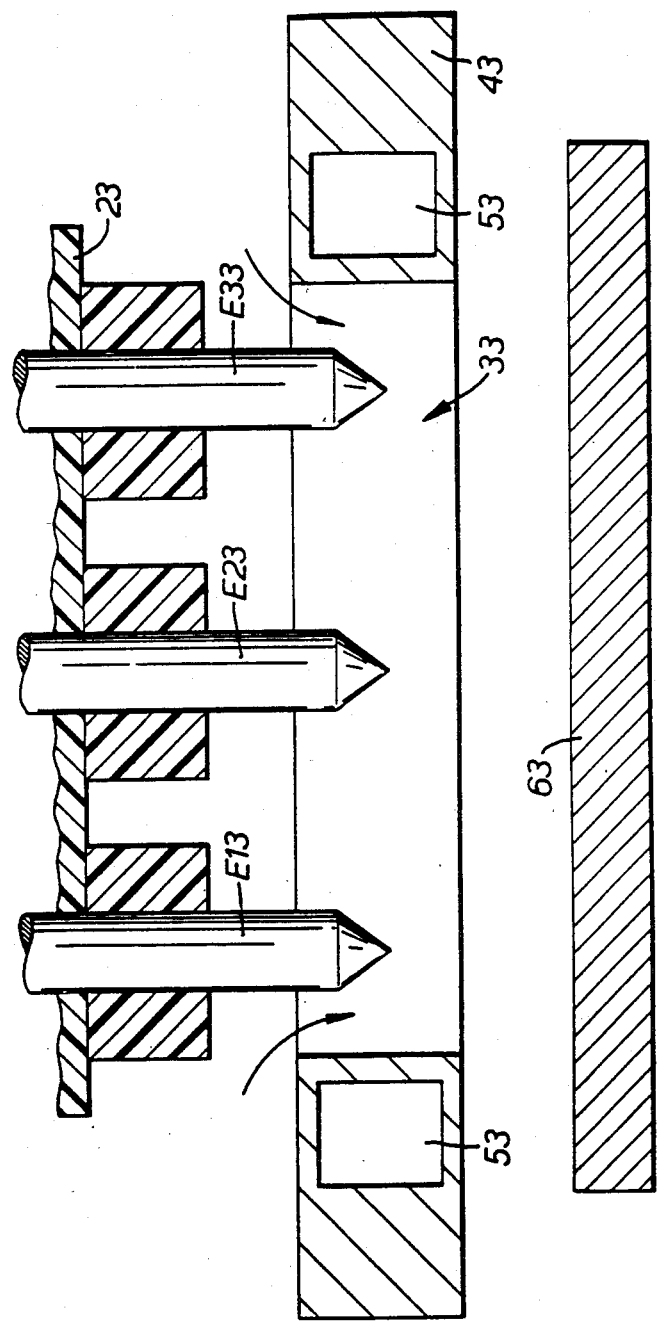

APPARATUS AND METHOD FOR GENERATING A PLURALITY OF ELECTRIC DISCHARGES

This invention relates to electric discharges. More particularly the invention relates to arrangements of two or more discharges adjacent to one another and to stabilization of the the discharges between respective electrodes, and also to a multi-electrode plasma torch.

The term "electric discharge" is used herein in relation to the conduction of electricity by ionised gas and includes processes ranging from, for example, glow discharges of the order of a few milliamps to arc discharges of more than 30,000 A.

Various methods have been used to increase the volume of electric discharges, for example, magnetic fields have been used to rotate discharges between coaxial electrodes and offset the inherent tendency of an electric discharge to constrict due to thermal and electromagnetic effects so as to distribute the energy more uniformly in the space between the electrodes and reduce the power density at the interfaces of the discharge and the electrodes.

There is a mutual attraction between two electric discharges that exist alongside one another when current flows in the discharges are in the same direction and, if they are sufficiently close to one another, the discharges coalesce. At the instant of coalescing the discharges have a central merged portion and four root portions. Such an arrangement has the advantage that the discharge is necessarily less concentrated in the vicinity of the electrodes and also the individual electrode currents are reduced for a given overall discharge current.

If the power for the respective discharges is provided from respective isolated power supplies it is possible to maintain such an arrangement, but the provision of separate power supplies can be disadvantageous.

Although the possibility of generation of coalesced discharges has been known for many years, it is a technique that has not found industrial application. Indeed the normal approach has been to avoid the production of coalesced discharges by maintaining the discharges sufficiently far apart.

Furthermore it has been accepted that in order to create a stable four root coalesced discharge it is essential to have separate power supplies. For example in an article entitled Multielectrode Arc Discharge in the Journal of Applied Spectroscopy, dated Feb. 14, 1967, V. N. Apolitskii when describing a coalesced discharge states that "the basic requirement is always separation of the power supplies which must not have a common point".

The necessity of using separate power supplies when generating coalesced discharges is a serious problem in practice since it raises the costs of the discharge apparatus and also makes the apparatus bulkier and more cumbersome to use.

The central portion of coalesced discharges are concentrated. Thus, the provision of a multi-electrode coalesced discharge is not satisfactory in certain applications. Also it is not possible to provide such discharges whose ends are closely adjacent to one another and which do not coalesce.

While the design of plasma torches have advanced in various respects over the years there are still limitations in the use of such devices. One such limitation is that the power output of many plasma torches is limited because at currents of the order of 1,000 amps the electrodes evaporate so quickly that their life is impractically short.

In an attempt to overcome this problem it is possible to provide a plurality of plasma torches working together. This however, results in a very bulky device and, with each torch having its own power supply, makes the device very expensive.

It is an object of the invention to provide an electric discharge apparatus and a method of generating electric discharges that in certain respects overcomes at least some of the disadvantages described above.

It is another object of the invention to provide stabilization of two or more discharges extending between respective electrodes but coalescing intermediate their ends and generated from a common power supply.

It is another object of the invention to provide a gas laser including a discharge tube in which two or more stable discharges are generated simultaneously.

It is another object of the invention to provide an improved plasma torch capable of operating with high discharge currents.

The invention provides an electric discharge apparatus including first and second electrodes defining a first discharge path, and third and fourth electrodes defining a second discharge path alongside the first discharge path, wherein the electrodes are electrically connected such that, in use, the current flow of a discharge along the first path is so different from the current flow of a discharge along the second path that, overall, the discharges repel one another and a respective impedance is associated with any electrical connection between the electrodes.

The first and second discharge paths may be within coalescing range.

The discharge paths are "within coalescing range" as hereby defined if they are sufficiently close to one another that discharges having current flows in the same direction would coalesce with one another.

In the case of direct currents, the current flow in the first discharge path in arranged to be in the opposite direction to the current flow in the second discharge path. In the case of alternating currents, the current flow in the first discharge path may be arranged to be of opposite phase to the current flow in the second discharge path, or the current flows may merely be sufficiently out of phase that the overall effect is that the discharges repel one another.

The first and third electrodes may be adjacent one another and the second and fourth electrodes may be adjacent one another. Each of the first and fourth electrodes may be connected through a respective impedance to a common terminal and each of the second and third electrodes may be connected through a respective impedance to another common terminal, the common terminals being for connection to a power supply. In this arrangement the apparatus is operated from a common power supply; if desired, however, the apparatus may be operated with each discharge path connected to a separate power supply.

A respective impedance may be connected to each electrode in the power supply path to that electrode. The impedances prevent discharges between the first and third electrodes or the second and fourth electrodes. The impedances may be resistors and/or inductors though capacitance may also be included. The impedances may be all of substantially the same value.

One or more further discharge paths defined by further electrodes may be arranged alongside the first and second discharge paths.

The apparatus may be embodied in discharge lamps such as fluorescent lamps, lamps used as a source of ultra violet radiation, decorative or display lighting or a gas laser. The apparatus may also be embodied in a spark plug.

The invention also provides a gas laser including a discharge tube in which are provided first and second electrodes defining a first discharge path, and third and fourth electrodes defining a second discharge path alongside the first discharge path, wherein the electrodes are electrically connected such that, in use, the current flow of a discharge along the first path is so different from the current flow of a discharge along the second path that, overall, the discharges repel one another.

The invention also provides a method of generating discharges including the steps of generating a first discharge between first and second electrodes, and generating a second discharge between third and fourth electrodes alongside the first discharge, wherein the current flow in the first discharge is so different from the current flow in the second discharge that, overall, the discharges repel one another, and a respective impedance is associated with any electrical connection between electrodes.

The first and second discharges may be within coalescing range.

The method may include generating further discharges alongside the first and second discharges.

The invention also provides an electric discharge apparatus including first and second terminals for connection to a power supply, a first set of electrodes comprising two or more electrodes, each electrode of the first set being connected through a respective first impedance to the first terminal, and a second set of electrodes comprising two or more electrodes, each electrode of the second set being connected through a respective impedance to the second terminal, the first and second sets of electrodes being spatially arranged such that, when, in use, the first and second terminals are connected across a power supply, stable electric discharges which coalesce are generated between respective electrodes of the first and second sets.

In order for the discharges to be stable the impedances are, preferably, each above a minimum value of the same order of magnitude as the impedance of the discharge during stabilized operation. Such a minimum value can readily be determined for any particular discharge apparatus. In the case of a discharge apparatus having two electrodes of the first set side by side and two electrodes of the second set side by side with supply voltages of 80 V-100 V and discharges of 15 mm length with discharge currents in the range of 10 A-20 A, resistors of less than 1Ω resistance are suitable. The impedance may be increased as much as desired above the minimum level but at the expense of increased power dissipation in the impedance.

The impedances may be resistors and/or, inductors though capacitance may also be included.

Preferably the first impedances are of substantially the same value and the second impedances are also of substantially the same value. The value of the first impedances and the value of the second impedances are also preferably the same.

Impedance adjusting means may be provided for adjusting the discharge currents. Such means may comprise an adjustable impedance connected between the power supply and the first or second terminal but alternatively the adjusting means may comprise means for adjusting the impedance of each of said first and second impedances. Preferably the adjusting means is arranged to adjust the impedance of each of the first impedances and each of the second impedances equally.

The power supply itself may have impedance which is shared with each electrode. If this is large compared to the individual stabilizing impedances the discharges will behave in the same way as discharges supplied from a single source and without individual stabilization, and one or more discharge roots will be extinguished.

The apparatus may be embodied in discharge lamps such as fluorescent lamps, lamps used as a source of ultra violet radiation, decorative or display lighting, or a gas laser.

The invention also provides a gas laser including a discharge tube, a first set of electrodes comprising two or more electrodes extending into the discharge tube, each electrode of the first set being connected through a respective first impedance to one side of a power supply, and a second set of electrodes comprising two or more electrodes extending into the discharge tube, each electrode of the second set being connected through a respective second impedance to an opposite side of a power supply, whereby stable electric discharges are generated between respective electrodes of the first and second sets.

The laser may be a $CO_2$ gas laser.

In one embodiment the electrodes are spatially arranged such that the discharges coalesce while in another embodiment the electrodes are spatially arranged such that adjacent discharges repel one another and do not coalesce.

All the first and second impedances may be of substantially the same value.

The invention also provides a method of generating two or more electric discharges extending between respective electrodes but coalescing intermediate their ends, the method including the following steps:

providing a first set of electrodes comprising two or more electrodes, providing a second set of electrodes comprising two or more electrodes, connecting each electrode of the first set through a respective impedance to a common source of a first potential, and connecting each electrode of the second set through a respective impedance to a common source of a second potential, the first and second sets of electrodes being spatially arranged such that stable electric discharges which coalesce are generated between respective electrodes of the first and second sets.

The first and second potentials provide a voltage across the electrodes which may be an A.C. voltage or a D.C. voltage. One of the potentials may be earth potential.

In another aspect, the invention provides a plasma torch comprising an electrode holder from which a plurality of electrodes electrically insulated from one another project and a pilot electrode common to more than one of said plurality of electrodes.

By providing a plurality of electrodes in a single torch a plasma torch capable of handling high discharge currents is provided that is both compact and economical. Since a common pilot electrode is provided the whole of the electrode can easily be cooled by a single cooling system.

Preferably a single pilot electrode is provided common to all of said plurality of electrodes.

The pilot electrode may have separate portions associated with respective ones of said plurality of electrodes but, in this case, the separate portions are electrically connected together.

In one embodiment of the invention a respective power supply is provided for initiating a discharge between each of said plurality of electrodes and the pilot electrode. On the other hand a common power supply is provided for supplying current to said plurality of electrodes. The common power supply is connected through respective impedances to each of said plurality of electrodes. Said plurality of electrodes may be surrounded by a common nozzle. It might be thought that the provision of a common pilot electrode would cause difficulties in initiating the discharges but by providing a separate power supply to initiate each discharge these difficulties are overcome.

The number of electrodes in said plurality may be between five and thirty. Since each electrode can carry a current of the order of 1,000 amps, it is therefore possible with thirty electrodes to have a total discharge current of 30,000 amps.

By way of example, embodiments of the invention will now be described with reference to the accompanying drawings, of which:

FIG. 19 is a sectional side view similar to FIG. 13 illustrating another modification that can be made to the plasma torch of FIGS. 13 and 14.

The same reference indicia are used in different drawings to designate corresponding parts.

Figure 1:
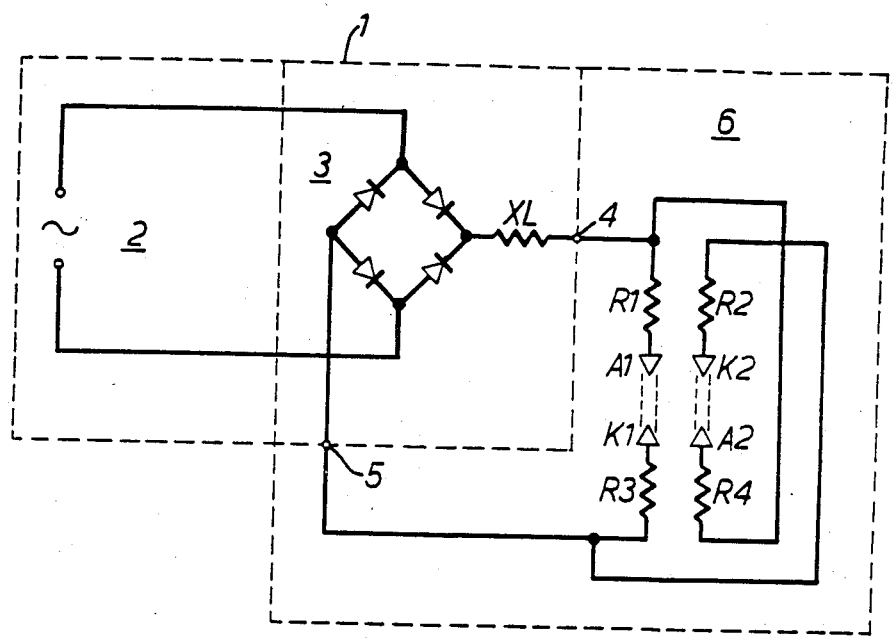
FIG. 1 is a diagram of an electrical discharge apparatus embodying the invention.

Referring to FIG. 1 a power supply 1 consisting of an A.C. voltage supply 2, a bridge rectifier 3 and an inductive impedance XL is connected to terminals 4 and 5 of a discharge apparatus 6. The discharge apparatus has a first anode A1 associated with a first cathode K1 and defining a first discharge path and a second anode A2 associated with a second cathode K2 and defining a second discharge path alongside the first path and within coalescing range of the first path. The first anode A1 and second cathode K2 are adjacent one another and similarly the second anode A2 and the first cathode K1 are adjacent one another. Each anode A1, A2 is connected through a respective resistor R1, R4 to the terminal 4 while each cathode K1, K2 is connected through a respective resistor R3, R2 to the terminal 5. The resistors R1, R2, R3 and R4 are typically all of the same value.

The voltage generated by the power supply is sufficient to create one discharge between the cathode K1 and anode A1 and another discharge between the cathode K2 and anode A2. The separation of the discharges is sufficiently small that they interact and, if the current flows in the discharges were in the same direction, they would attract one another and coalesce. However since the current flows are in opposite directions the discharges repel one another and do not coalesce.

Because electric discharges generally have a negative dynamic resistance characteristic, that is as the current increases the resistance of the discharge decreases, the generation of two discharges from a common power supply is inherently unstable since an increase in the current in one discharge will tend to reduce the resistance of that discharge path tending in turn to increase further the current through the discharge. As the current in one discharge increases so the current in the other discharge is reduced, since the currents are derived from a common power supply, until all the current is carried in one discharge and the other discharge is extinguished.

In the circuit of FIG. 1, however, the resistors R1, R2, R3 and R4 are provided and if these impedances are sufficiently large, then a drop in the resistance in one discharge will still tend to lead to an increase in current in the discharge but, because of the resistors, the voltage across the discharge path is also reduced and the current in the discharge is limited. Any increase in the current in the discharge produces an increased potential drop across the associated resistors which overrides any reduction in the potential drop across the discharge path. Accordingly the current remains evenly distributed between the two discharges.

It will be noted that while the discharges are described as extending between anode A1 and cathode K1 and between anode A2 and cathode K2 there are also potential discharge paths between anode A1 and cathode K2 and also between anode A2 and cathode K1. The provision of a respective resistor for each electrode of the apparatus ensures that the resistance connected in these potential discharge circuits (not including the resistance of the discharge path) is as great as that connected in the intended discharge circuits, so that provided the potential discharge paths are longer than the intended discharge paths, there are no discharges along these potential discharge paths.

There are other ways of preventing discharges along these potential discharge paths. For example, if an A.C. supply is being used the circuit arrangement shown in FIG. 1 may be modified so that the phases of the voltages applied to adjacent discharge paths are out of phase sufficiently to prevent adjacent discharges coalescing but not in direct anti-phase relationship. Consequently, the highest potential at anode A1 does not occur at the same time as the lowest potential at cathode K2 so that the peak potential differences along these potential discharge paths is less than the peak potential differences across the intended discharge paths.

Another way of preventing discharges along the potential discharge paths is to arrange for the spacing of the anode A1 and cathode K2 from the cathode K1 and the anode A2 to be adjustable. This spacing can then be reduced to a minimum to initiate the discharges and then drawn out to the desired spacing once the discharges have been ignited (it will be appreciated that a much larger electric field is required to ignite a discharge than to maintain the discharge once ignited). Another alternative is to introduce an ignition electrode partway along each of the intended discharge paths.

In one particular example of the invention the adjacent electrodes were separated from each other by 10 mm, and the discharge paths were both of length 10 mm. Resistors R1, R2, R3 and R4 were each of resistance 5Ω and with this arrangement an average rectified open circuit voltage of 110 V was applied across the terminals 4, 5 generating a total discharge current of about 10 A, with a discharge voltage of about 60 V.

In the example described above there are only two discharge paths but it is of course possible to add further electrodes alongside those shown so that more than two adjacent discharge paths are provided.

Figure 2:
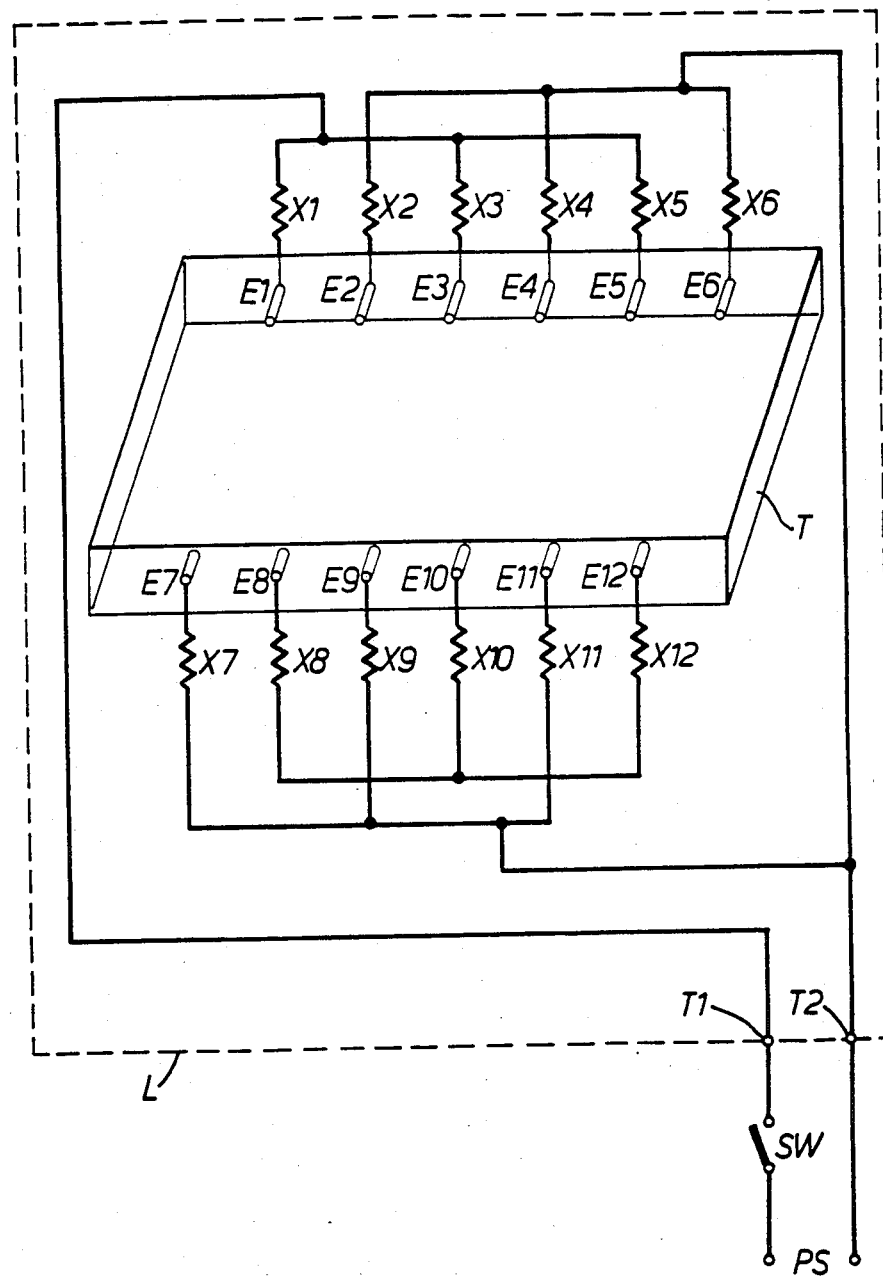
FIG. 2 shows a cold cathode fluorescent lamp embodying the invention.

FIG. 2 shows a cold cathode fluorescent lamp L having multiple discharge paths. Instead of having a conventional tube of circular cross-section, the tube T is of flat cuboidal shape which in itself is advantageous since, for example, it enables a large illuminated surface to be defined by the lamp. It should be understood, however, that a tube of circular or other cross-section could be employed. In the example shown, there are six electrodes E1 to E6 provided on one of the longer sides of the lamp, and another six electrodes E7 to E12 provided on the other side of the lamp. The electrodes E1 and E7, E2 and E8, E3 and E9 etc define respective adjacent discharge paths. A respective impedance X1, X2, X3 . . . X12 is connected between each electrode E1, E2, E3 . . . E12 and one of the terminals T1 and T2 connected through a switch SW to the mains power supply PS. The electrodes E1, E3, E5, E8, E10 and E12 are connected to terminal T1 while the other electrodes are connected to terminal T2. The impedances X1, X2, X3 etc are preferably all the same and may include a resistive and/or an inductive component.

When the switch SW is closed, respective discharges are generated between the electrodes E1 and E7, E2 and E8, E3 and E9, E4 and E10, E5 and E11, and E6 and E12. Each discharge is of opposite phase to the adjacent discharge(s) and therefore the discharges do not coalesce. Since the discharges are spread over the tube, the fluorescent coating on the tube provides a light output distributed reasonably evenly over the surface of the tube. Also for a given total discharge current, the individual electrode currents are reduced to one sixth of those in a single discharge tube, so that a longer electrode life, or alternatively a greater output can be achieved.

Although in the schematic illustration in FIG. 2 the impedances are shown connected externally of the tube, it should be understood that the impedances could be provided inside the tube.

As already mentioned with reference to FIG. 1 some technique must be employed to prevent discharges between adjacent electrodes that are of opposite polarity. Suitable techniques would be to mount for example the electrodes E1 to E6 so that they can be moved very close to their respective opposite electrodes E7 to E12 to initiate a discharge and then drawn back to the position shown, or to provide ignition electrodes partway along each of the intended discharge paths.

Figure 3:
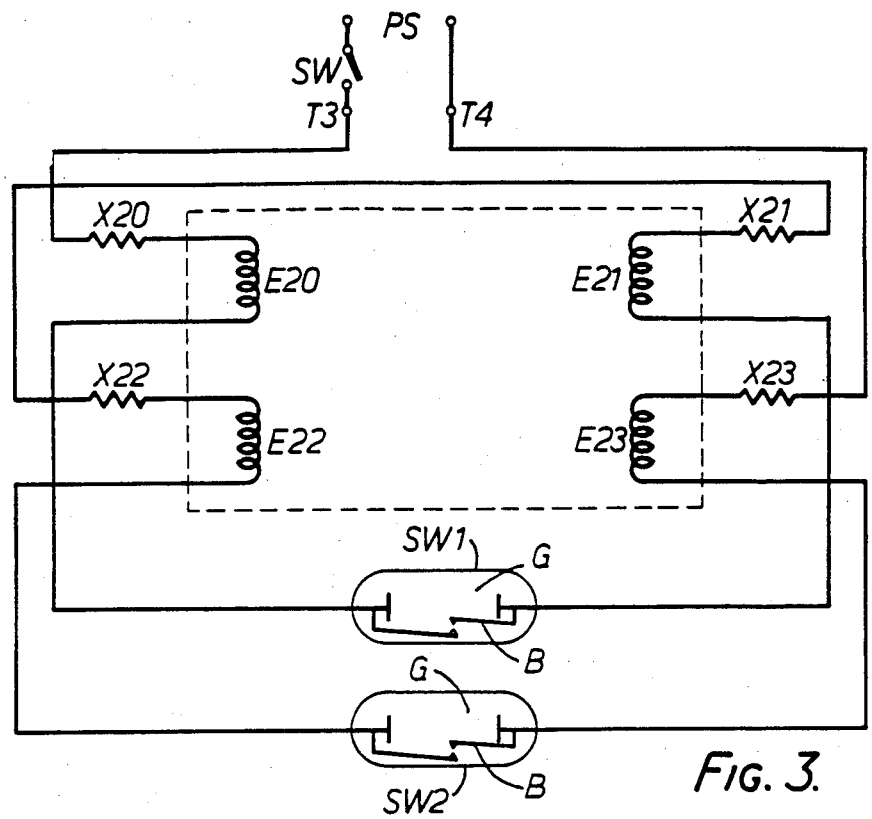
FIG. 3 shows a hot cathode fluorescent lamp embodying the invention.

FIG. 3 shows an electric circuit diagram for a hot cathode fluorescent lamp having two discharge paths. One discharge path is defined by electrodes E20 and E21 and another adjacent discharge path by electrodes E22 and E23. A respective impedance X20, X21, X22 and X23 having a large inductance is connected between one terminal of each electrode and one of terminals T3 and T4 connected through a switch SW to mains power supply PS. The impedances X20, X21, X22 and X23 are all the same.

The other terminals of the electrodes E20 and E21 are connected together through a starting switch SW1 and similarly the other terminals of the electrodes E22 and E23 are connected together through a starting switch SW2. The starting switches SW1 and SW2 are identical and each comprise a glow lamp G and an associated bimetallic switch B in the glow lamp and connected in parallel with the discharge path of the glow lamp. The switch B is open at room temperature and closes upon heating.

When the switch SW is closed glow discharges are generated in the lamps G. Considering for example the circuit with electrodes E20 and E21, an electric circuit is formed from the terminal T3 through the impedance X20, the electrode E20, the glow discharge in lamp G, the electrode E21 and the impedance X21 to the terminal T4. The glow discharge heats the bimetallic switch which closes, short circuiting the glow discharge and causing a larger current to flow through the electrodes making them incandescent. The bimetallic switch cools and then opens interrupting the electric circuit and, because of the inductive impedances X20 and X21, creating a very high voltage across the electrodes thereby creating a discharge therebetween. Discharges do not occur because adjacent electrodes, for example between the electrodes E20 and E22 because the voltage available to generate a discharge between these electrodes is less and the inductive impedance X22 also acts to oppose the voltage between these electrodes. The glow discharge lamp which is now shunted by the discharge between the electrodes E20 and E21 remains extinguished and the bimetallic switch therefore remains open. It will be understood that the circuit with electrodes E22 and E23 operates in exactly the same manner.

It should be understood that the inductive impedances serve the following functions, namely to provide a very high voltage to ignite a discharge, to stabilize the discharge and to oppose the voltage between adjacent electrodes during ignition of a discharge. These functions may be served by one or more components.

Although in FIG. 3, only two adjacent discharge paths are shown it will be understood that further discharge paths, for example six as in FIG. 2, may be provided.

In the embodiments shown in FIGS. 1 to 3, a common power supply is used to generate the discharges but it should be understood that separate power supplies may be employed.

The invention may also be embodied in discharge lamps such as fluorescent lamps, lamps used as a source of ultra violet radiation, decorative or display lighting or a gas laser. Embodiments of gas lasers are described later with reference to FIGS. 9 to 12.

Figure 4:
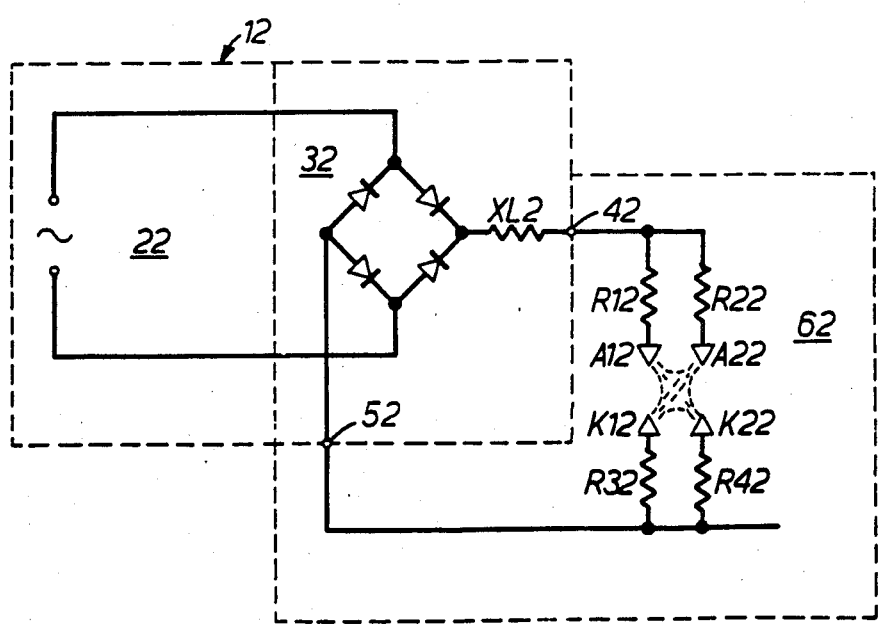
FIG. 4 is a diagram of another electrical discharge apparatus embodying the invention.

Referring now to the embodiment of FIG. 4 a power supply 12 consisting of an A.C. Voltage supply 22, a bridge rectifier 32 and an inductive impedance XL2 is connected to terminals 42 and 52 of a discharge apparatus 62. The discharge apparatus has a pair of anodes A12, A22 defining a first set of electrodes and a pair of cathodes K12, K22 defining a second set of electrodes. Each anode A12, A22 is connected through a respective resistor R12, R22 to the terminal 42 and each cathode K12, K22 is connected through a respective resistor R32, R42 to the terminal 52.

The voltage generated by the power supply 12 is sufficient to create one discharge between the cathode K12 and anode A12 and another discharge between the cathode K22 and anode A22. However the separation of the discharges is sufficiently small that they interact and attract one another so that the discharge consists of a central region common to both discharges and peripheral regions adjacent to each electrode.

Figure 5:
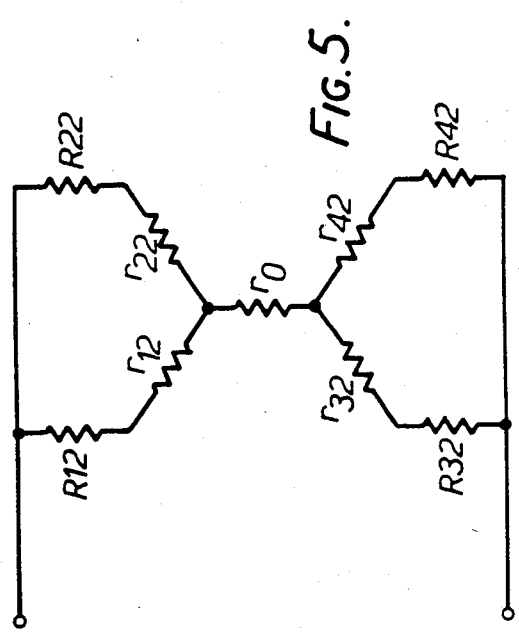
FIG. 5 shows the equivalent circuit for part of the apparatus of FIG. 4.

FIG. 5 shows the equivalent circuit for the discharge arrangement of FIG. 4. Resistance $r_0$ is the resistance of the discharge path common to both discharges while resistances $r_{12}$, $r_{22}$, $r_{32}$ and $r_{42}$ are resistances of the discharge paths between the common discharge path and the resistors $R_{12}$, $R_{22}$, $R_{32}$ and $R_{42}$ respectively.

As already mentioned, electric discharges generally have a negative dynamic resistance characteristic, that is as the current increases the resistance of the discharge decreases. Thus the value of the resistances $r_{12}$, $r_{22}$, $r_{32}$ and $r_{42}$ are variable and dependent upon the current carried by the discharge.

Figure 6:
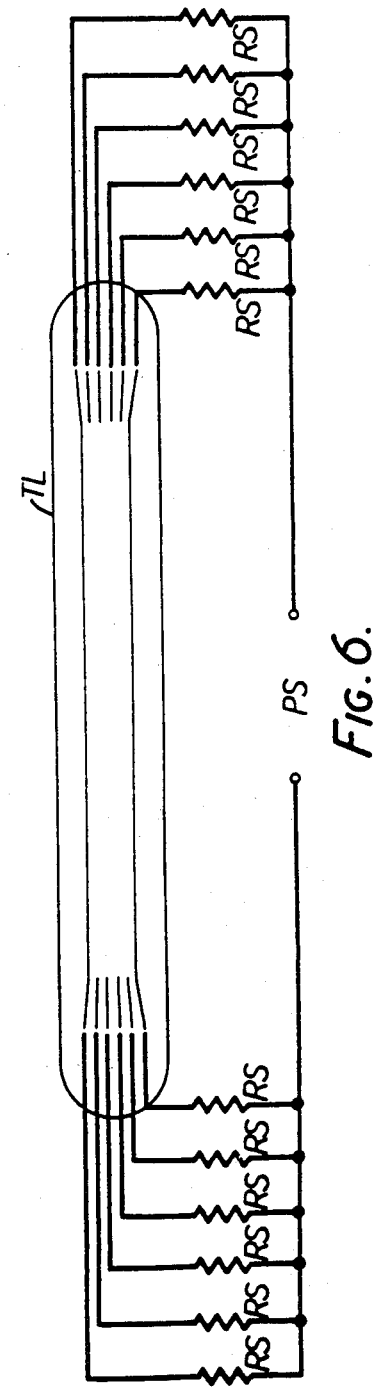
FIG. 6 is a schematic drawing of a discharge lamp embodying the invention.

The manner in which stability of the discharge is obtained can be understood by considering the operation of the upper branches of the circuit shown in FIG. 6 and making the simplifying approximation that the junction of resistances $r_{12}$ and $r_{22}$ is at constant potential.

If the stabilizing resistors R12 and R22 are not employed so, that R12 and R22 are zero, then, with a symmetrical arrangement of electrodes, the discharge paths represented by resistances $r_{12}$ and $r_{22}$ will be the same length and $r_{12}$ and $r_{22}$ will be equal so that equal currents flow through each path. If, however, owing to a change in, for example, a physical property of a discharge path, the resistance $r_{12}$ drops slightly this will lead to an increase in current through the resistance $r_{12}$ which in turn will further reduce the resistance $r_{12}$ as a result of the negative dynamic resistance of the discharge. As the resistance $r_{12}$ drops so the current through resistance $r_{22}$ decreases and accordingly the resistance $r_{22}$ increases. Eventually the discharge of resistance $r_{22}$ is extinguished and all the current passes through the alternative discharge path.

On the other hand, with sufficiently large resistors R12 and R22 a drop in the resistance $r_{12}$ owing to a change in a physical property of the discharge path leads to an increase in current through this discharge path but because of the resistor R12, the voltage across the discharge path is also reduced and the increase in current through resistance $r_{12}$ is limited. Any increase in the current through the resistance $r_{12}$ produces an increased potential drop across the resistance R12 which overrides any reduction in the potential drop across resistance $r_{12}$. Accordingly the current remains distributed between the discharge paths of resistance $r_{12}$ and $r_{22}$.

From the description above it will be clear that it is necessary to provide a respective resistance for each electrode of the apparatus of FIG. 4 in order to provide a stable discharge.

The inductive impedance XL2 operates to smooth the output of the rectifier 32 and also opposes changes in the discharge current thereby assisting in stabilization of the discharge.

In one particular example of the invention the anodes A12 and A22 were separated from each other by 10 mm, the cathodes K12 and K22 were separated from each other by 10 mm, and the anodes were separated from the cathodes by 10 mm, with the cathodes K12 and K22 vertically below the anodes A12 and A22 respectively. Resistors R12, R22, R32 and R42 were each of resistance $5\Omega$. With this arrangement an average rectified open circuit voltage of 110 V was applied across the terminals 4, 5 generating a total discharge current of about 10 A, with a discharge voltage of about 60 V.

Although in the described embodiment the power supply generates full wave rectified direct current, the discharge apparatus may be used with a constant voltage D.C. supply or with an A.C. supply.

It should be understood that additional anodes A32, A42 etc. with respective stabilizing resistors may be added in parallel with anodes A12 and A22 and similarly additional cathodes with respective stabilizing resistors may be added in parallel with cathodes K2 and K22. It is not essential that the number of anodes and cathodes be the same: for example four anodes and two cathodes could be provided.

If it is desired to regulate the discharge current then the resistors R12, R22, R32 and R42 may be made variable and connected to a common control which adjusts their resistance equally.

Apparatus of the kind shown in FIG. 4 may be used in a variety of applications but one particular application in which it is of particular value is in a high pressure discharge lamp. FIG. 6 shows schematically the electrode arrangements for such a lamp TL. In place of the usual single anode and cathode at respective ends of the lamp a plurality of anodes and cathodes are provided. In the example shown in FIG. 6 six cathodes and six anodes are provided, each electrode having a stabilizing resistance RS connected between it and a common power supply PS. At present discharge lamps can be limited in current rating by the rate of evaporation of the electrode material. With the arrangement shown in FIG. 6, however, the individual electrode currents are limited to one sixth of the total discharge current so that a longer electrode life or alternatively a greater output can be achieved.

No specific arrangement for initiating the discharges has been described but it will be understood that conventional techniques may be employed. One method of initiating the discharges is to introduce an ignition electrode partway along each of the intended discharge paths; another method is to use an inductive starting circuit.

Although in the schematic illustration in FIG. 6 the stabilizing resistances RS are shown connected externally of the discharge lamp, it should be understood that the resistances could be provided inside the tube.

Figure 7:
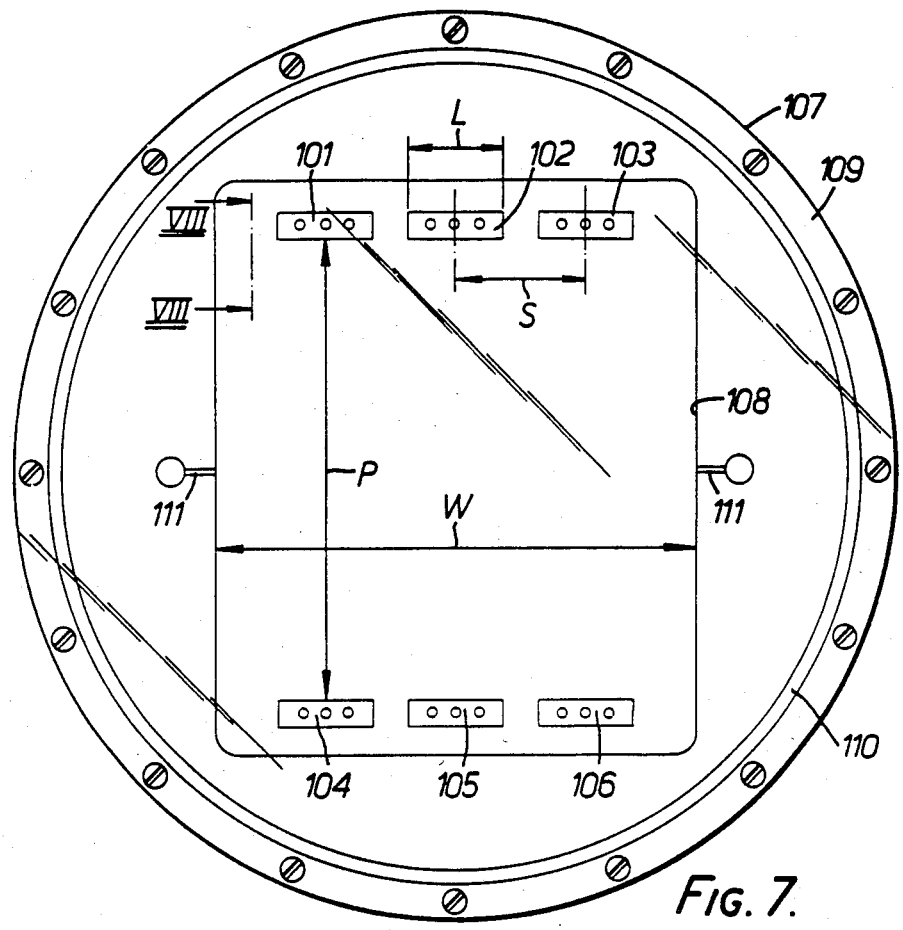
FIG. 7 is a plan view of a discharge lamp embodying the invention.
Figure 8:
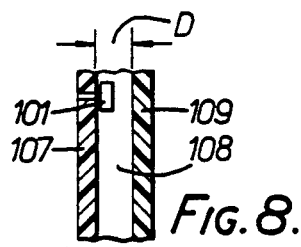
FIG. 8 is a sectional side view along the lines VIII—VIII of the discharge lamp of FIG. 7.

FIGS. 7 and 8 show one physical construction for an experimental discharge lamp embodying the invention. The lamp has two sets of electrodes: a first set comprising three electrodes 101, 102 and 103 for connection through respective impedances (not shown) to one terminal of a power supply and a second set comprising three electrodes 104, 105 and 106 for connection through respective impedances (not shown) to the other terminal of a power supply.

The lamp has a body portion comprising a circular body 107 having a rectangular hollow 108 formed therein and a cover 109 sealed to the body 107 by an 'O' ring 110 and clamped in position by sixteen clamping bolts equispaced around the periphery of the cover.

The electrodes 101 to 106 are mounted in the base 107 and extend into the hollow 108 where they terminate in rectangular heads electrical connection (not shown) being made to the electrodes outside the lamp. Passageways 111 extend in the body 107 between the hollow and the base of the body 107 to define a gas inlet and outlet.

In the particular experimental example described the body 107 and cover 109 are made of perspex and are of 200 mm diameter, the electrode heads have a length "L" of 20 mm, are of 8 mm square cross-section and are spaced apart by a centre to centre spacing "S" of 35 mm. Each electrode is made of Nickel and in order to increase its effective surface area a 6 mm through bore (not shown) is provided along its longitudinal axis and three 4 mm diameter holes provided in its front face, which, apart from the central hole, pass right through the electrode. The sets of electrodes are spaced apart by a distance P of 100 mm, the width "W" of the hollow 108 is 125 mm, the depth "D" of the hollow is 10 mm and the thickness of the cover 109 is 10 mm and the thickness of the base of the body 107 is 25 mm. In this example, with the chamber defined by the hollow 108 filled with Argon and a droplet of mercury and evacuated to a pressure of 3 torr (400 Pa), an operating voltage of 800 Volts between the two sets of electrodes gave a discharge current of 0.8 amps per electrode or a total current of 2.4 amps.

If desired, Neon gas may be added in order to assist in the initiation of a discharge.

Other applications of apparatus of the kind shown in FIG. 4 may be found in fluorescent lamps, lamps used as a source of ultra violet radiation, decorative or display lighting or a gas laser. Embodiments of gas lasers will now be described with reference to FIGS. 9 to 12.

Figure 9:
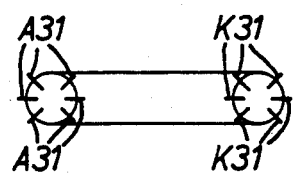
FIG. 9 is a schematic perspective view of an electrode configuration for use in a gas laser.
Figure 10:
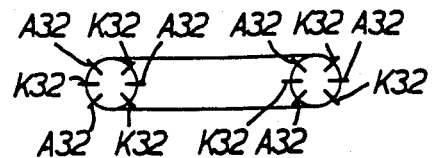
FIG. 10 is a schematic perspective view of another electrode configuration for use in a gas laser.

FIGS. 9 and 10 show diagrammatically the electrode arrangements which may be employed in a gas laser. The arrangement shown in FIG. 9, which is for generating coalescing discharges, comprises a set of six anodes A31 arranged on radii of a circle symmetrically and equiangularly spaced and a set of six cathodes K31 arranged similarly on radii of another circle symmetrically and equiangularly spaced. The arrangement shown in FIG. 10, which is for generating adjacent non-coalescing discharges, comprises a set of six electrodes comprising alternating anodes A32 and cathodes K32 arranged on radii of a circle symmetrically and equiangularly spaced and another set of six electrodes comprising alternating anodes A33 and cathodes K33 arranged on radii of another circle symmetrically and equiangularly spaced.

Figure 11:
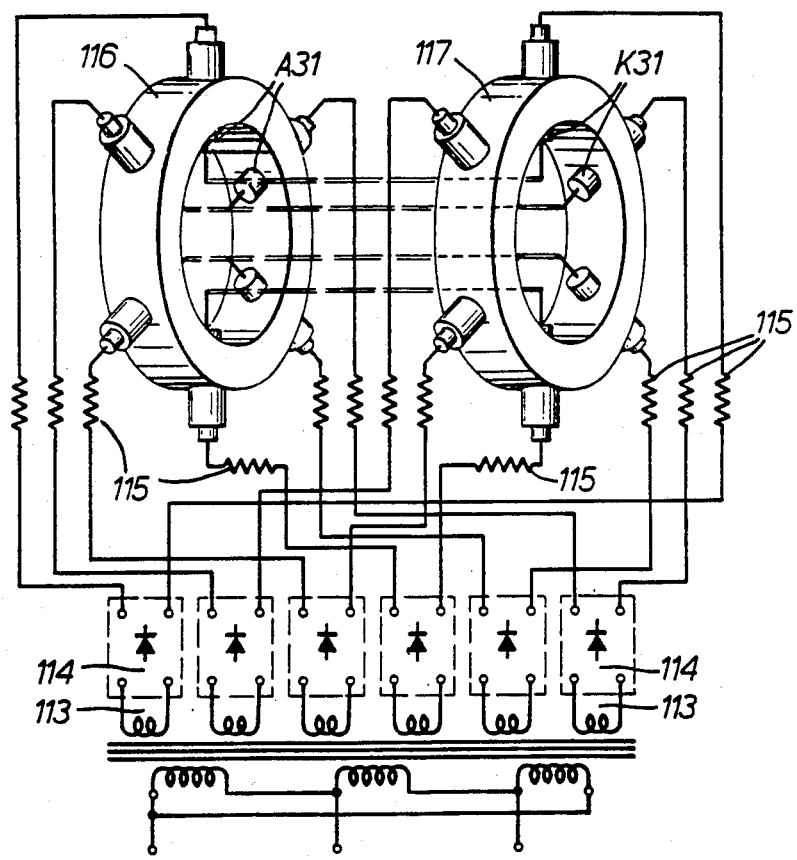
FIG. 11 is a more detailed view of the arrangement shown in FIG. 9.

FIG. 11 shows more practically the electrode arrangement already described with reference to FIG. 9 and also an electrical power supply circuit. A three phase supply is transformed to provide six separate alternating voltage supplies 113 which are each rectified by respective rectifiers 114. The positive output of each rectifier 114 is connected via a respective stabilizing impedance 115 to a respective anode A31 and the negative output is connected via a respective stabilizing impedance 115 to a respective cathode K31. Each anode and cathode pair connected to the same rectifier are located directly opposite to one another. The anodes are mounted on an insulating electrode holder 116 and similarly the cathodes are mounted on an insulating electrode holder 117.

Figure 12:
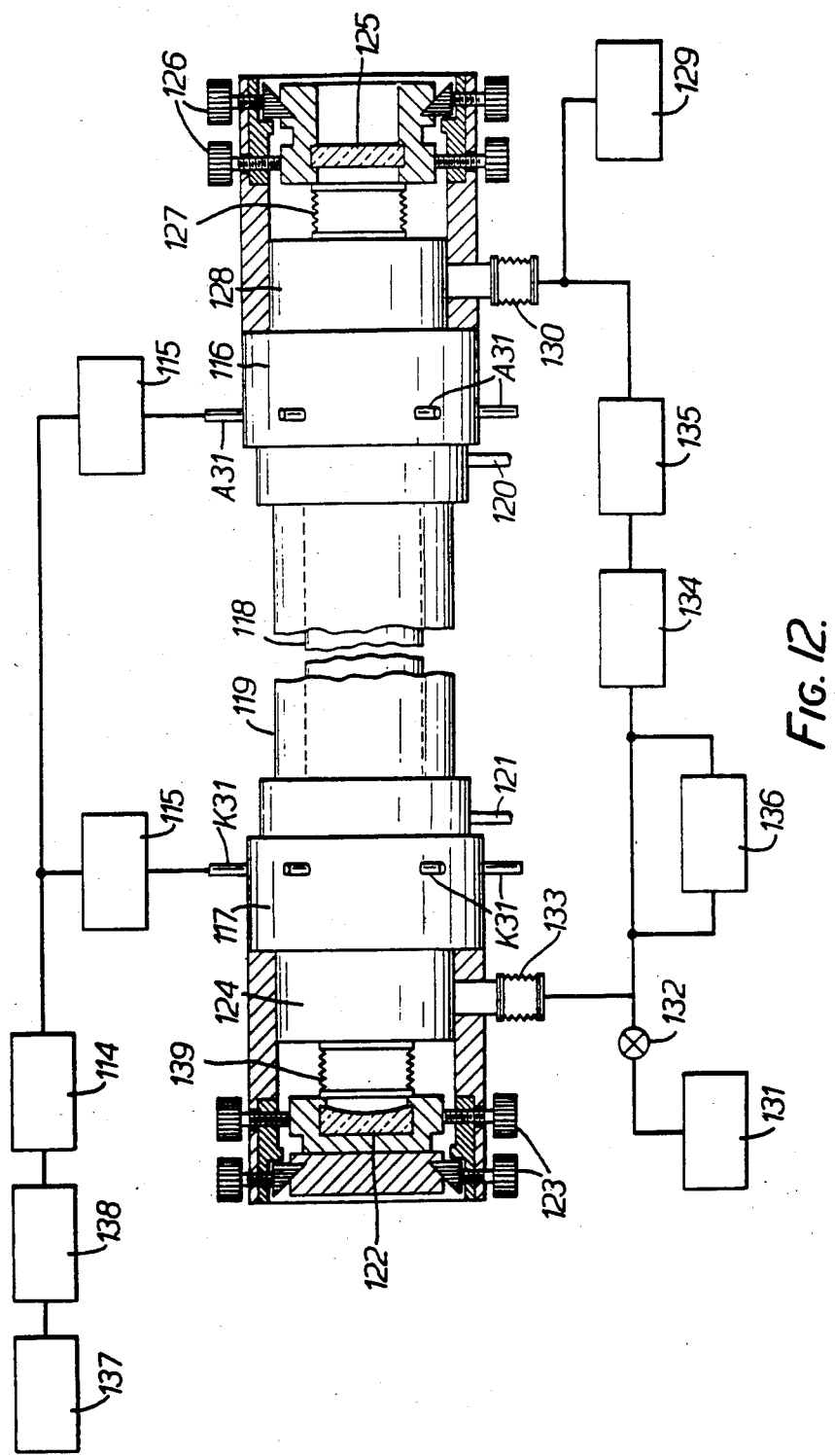
FIG. 12 is a schematic diagram of a gas laser employing the electrode configuration shown in FIG. 11.

FIG. 12 shows schematically a $CO_2$ gas laser embodying the invention and employing the electrode arrangement and power supply shown in FIGS. 9 and 11. The laser has a discharge tube 118 surrounded by a cooling water jacket 119 with a water inlet 120 and water outlet 121. The cathode holder 117 is mounted at the end of the discharge tube adjacent the rear mirror and the anode holder 116 is mounted at the forward end. A rear mirror 122 together with adjusters 123 is connected via bellows 139 to an assembly head 124 which in turn is connected to the cathode holder 117. A front mirror/window 125 with adjusters 126 is similarly connected via bellows 127 to an assembly head 128 connected to the anode holder 116.

A gas supply 129 is connected via bellows 130 to a gas inlet at the front of the discharge cavity and a vacuum pump 131 is connected via a control valve 132 and a bellows 133 to a gas outlet. A gas circulation path is also provided by a recirculating pump 134 and a heat exchanger 135. A reconstituting catalyst 136 is connected in a by-pass of the main flow through which a fraction of the total gas flow passes.

Power is supplied to the electrodes through a voltage regulator 137, a high-voltage transformer 138, rectifiers 114 and stabilizing impedances 115. It should be understood that, as shown in FIG. 11, six separate rectifiers, each with a respective stabilizing impedance, are connected to each electrode holder. However, it will also be understood from the description with reference to FIG. 5 that a common rectifier could be employed.

In operation, discharges are generated between each pair of anodes and cathodes and these discharges coalesce along the length of the discharge tube. In one particular example of the invention the discharge cavity is of 1 m length and 100 mm diameter. With a voltage between the electrodes of 11 kV a current of 150 mA is generated in each discharge provided a total current of 0.9 A.

FIGS. 11 and 12 show the practical application of the electrode configuration described with reference to FIG. 9. It should however be understood that the electrode configuration described with reference to FIG. 10 may be applied similarly. In this case, as already described for example with reference to FIG. 2 steps must be taken to prevent discharging between adjacent anodes and cathodes. With the configuration shown in FIG. 10 the length of the intended discharge path is very much larger than the length of a potential discharge path between adjacent electrodes and in order to avoid this problem it is possible either to use separate power supplies for each discharge or to arrange the intended discharge paths transverse to the discharge tube rather than along the tube.

Figure 13:
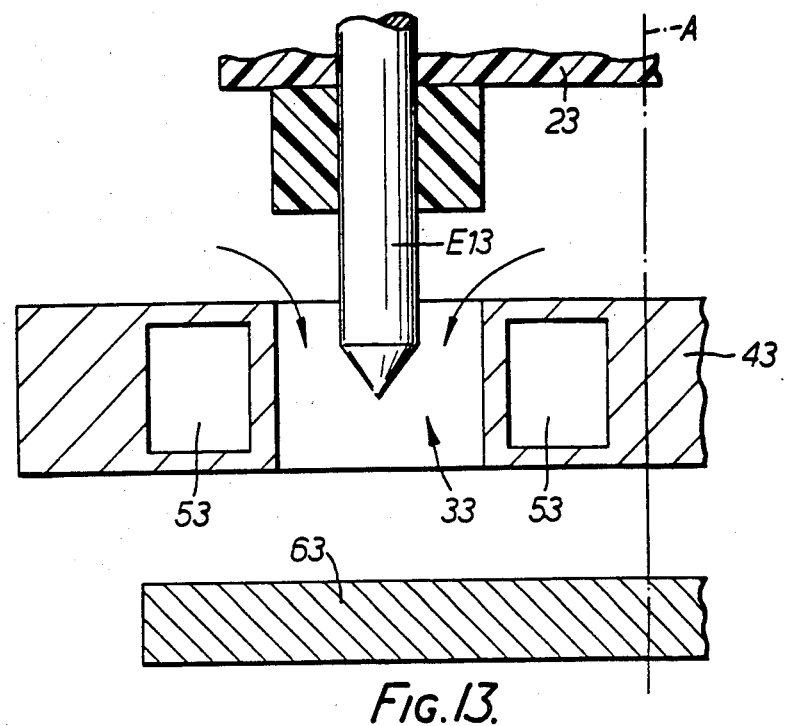
FIG. 13 is a sectional side view of part of a plasma torch embodying the invention.
Figure 14:
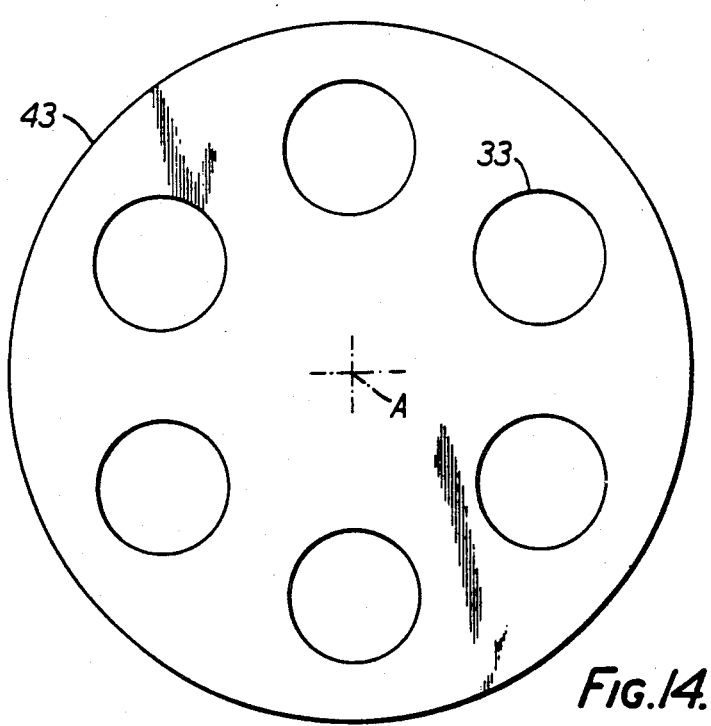
FIG. 14 is a plan view of part of torch illustrating the relative positions of the electrodes.
Figure 15:
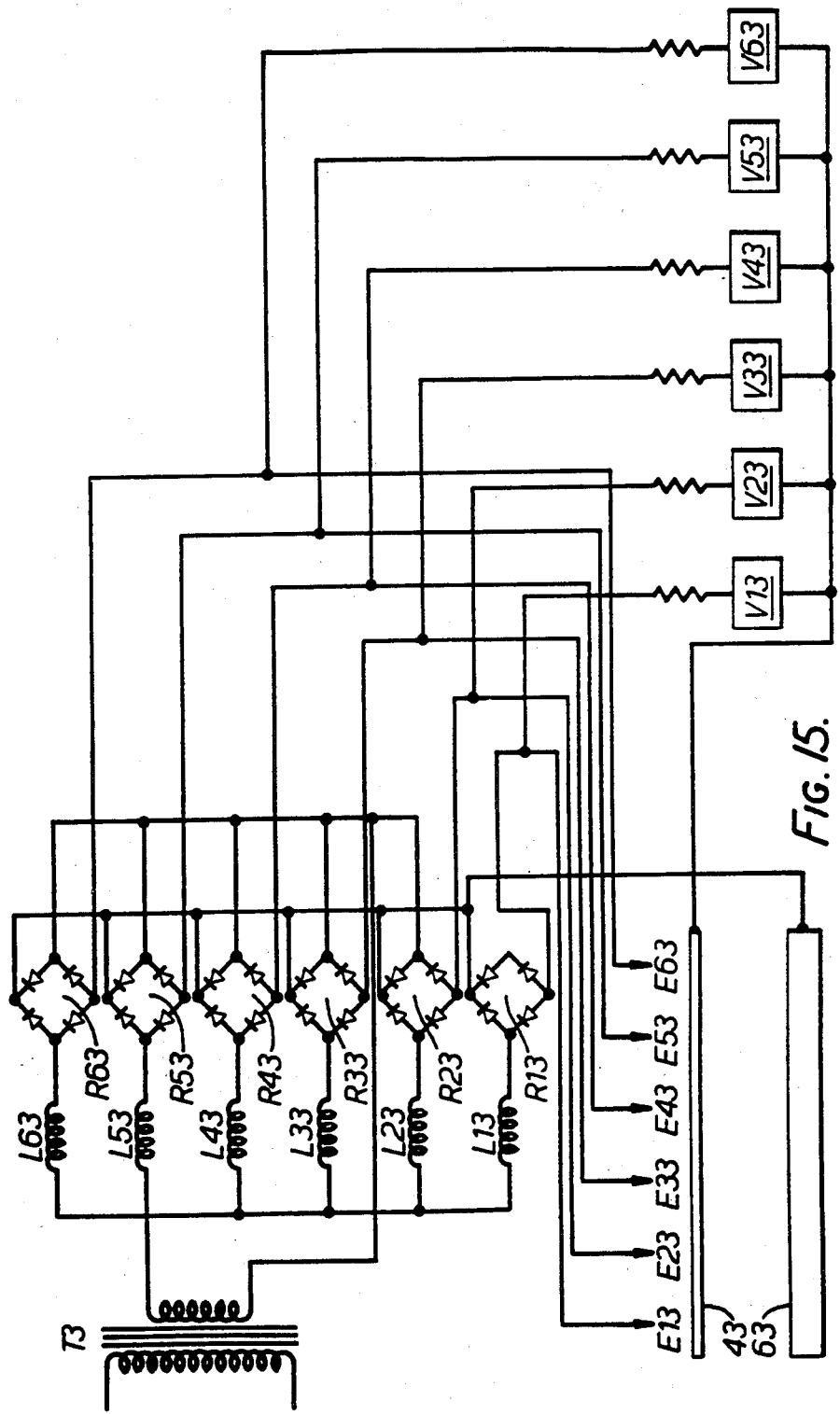
FIG. 15 is a diagram of an electrical circuit including the plasma torch of FIGS. 13 and 14.

FIGS. 13 to 15 show a plasma torch embodying the invention. The figures are schematic and are provided to illustrate novel features of the plasma torch. Other features known to those skilled in the art from conventional design techniques of plasma torches are not illustrated. Such conventional torches are described for example in Welding Handbook, Section 3, Part A, "Welding, Cutting and Related Processes", 6th Edition (Ed. L. Phillips, American Welding Society, 1970).

Referring to FIGS. 13 and 14 the plasma torch illustrated has six tungsten electrodes E13, E23, E33, E43, E53 and E63 equiangularly spaced about a central axis A. The electrodes are held in an insulated holder 23, shown in plan view in FIG. 14, from which they each project downwardly into a respective nozzle aperture 33 of an electrically conducting member 43 which is provided with water cooling channels 53. In use gas, for example argon, is supplied to the torch and flows through the apertures 33 past the electrodes. An electrically conducting workpiece 63 which may, for example, in the case of a plasma furnace be scrap steel to be melted is located under the plasma torch.

FIG. 15 shows the electrical supply arrangement for the torch. Each of the electrodes E13, E23, E33, E43, E53 and E63 is connected through a respective rectifier R13, R23 . . . R63 and inductance L13, L23 . . . L63 to the secondary winding of a transformer T3, whose secondary winding, in this example, is able to provide sufficient current to cater for the high discharge currents at each of the electrodes E13, E23 . . . E63 during full operation of the torch. Thus for example the secondary winding may have a current rating of the order of 6,000 amps in this example. Typically the rectifiers R13, R23 . . . R63 and inductors L13, L23 . . . L63 are all the same.

A respective D.C. voltage supply V13, V23 . . . V63 in series with a current limiting impedance X13, X23 . . . X63 is also connected between each of the electrodes E13, E23 . . . E63 and the member 43. The D.C. voltage supplies are relatively low current (for example about 100 A) and high voltage (for example 200 V) supplies and are provided to initiate and maintain the pilot discharges between each of the electrodes E13, E23 . . . E63 and the member 43.

From the description above the operation of the device will be generally clear to those skilled in the art and will not be described in detail here. The respective pilot discharges are generated from separate supplies and thus there are not difficulties in maintaining the pilot discharges in parallel to one another. On the other hand the main discharges occurring during full operation of the torch are generated from a single supply and this would conventionally be considered an unstable arrangement. Because electric discharges, as already mentioned, generally have a negative dynamic resistance characteristic, that is as the current increases the resistance of the discharge decreases, the generation of two or more discharges from a common power supply is inherently unstable since an increase in the current in one discharge will tend to reduce the resistance of that discharge path, tending in turn to increase further the current through the discharge. As the current in one discharge increases so the current in the other discharge is reduced, since the currents are derived from a common power supply, until all the current is carried in one discharge and the other discharge is extinguished.

In the circuit of FIG. 15, however, the inductors L13, L23 . . . L63 are provided and if these are sufficiently large, then a drop in resistance in one discharge will still tend to lead to an increase in current in the discharge but, because of the inductors, the voltage across the discharge path is also reduced and the current in the discharge is limited. Any increase in the current in the discharge produces an increased voltage drop across the associated inductor which overrides any reduction in the voltage across the discharge path. Accordingly the current remains evenly distributed between the discharges.

Since a common nozzle defining member 43 is provided, considerable and important reductions in the size and complexity of the device are obtained compared with employing six separate plasma torches.

Figure 16:
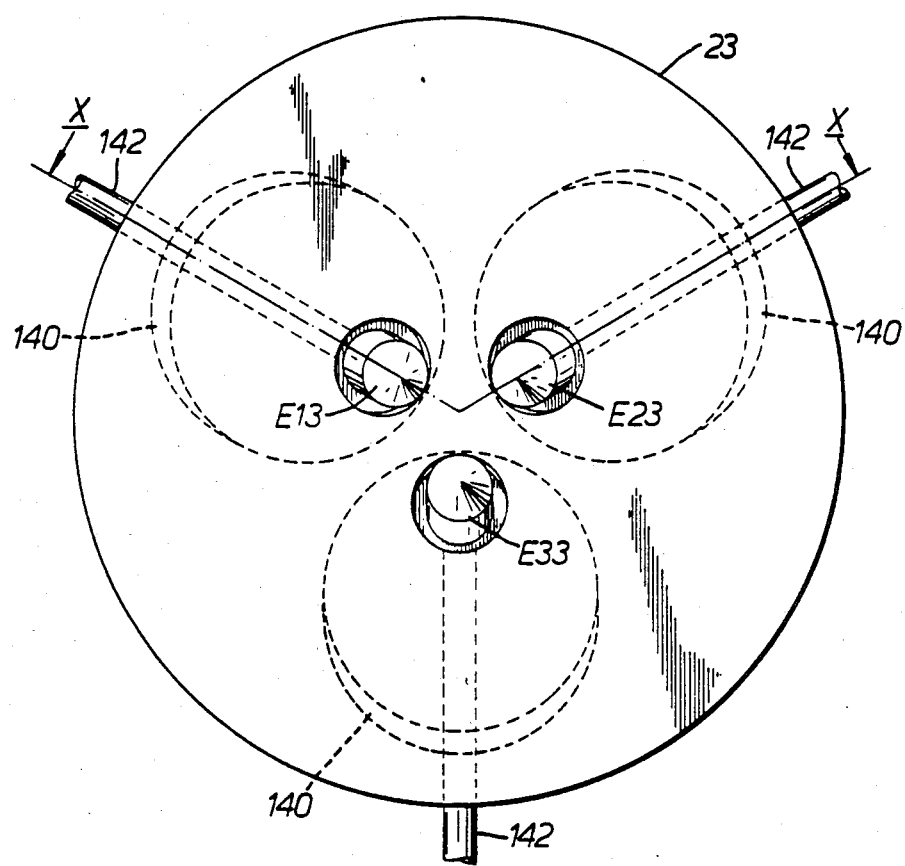
FIG. 16 is a schematic view from below of another form of plasma torch embodying the invention.
Figure 17:
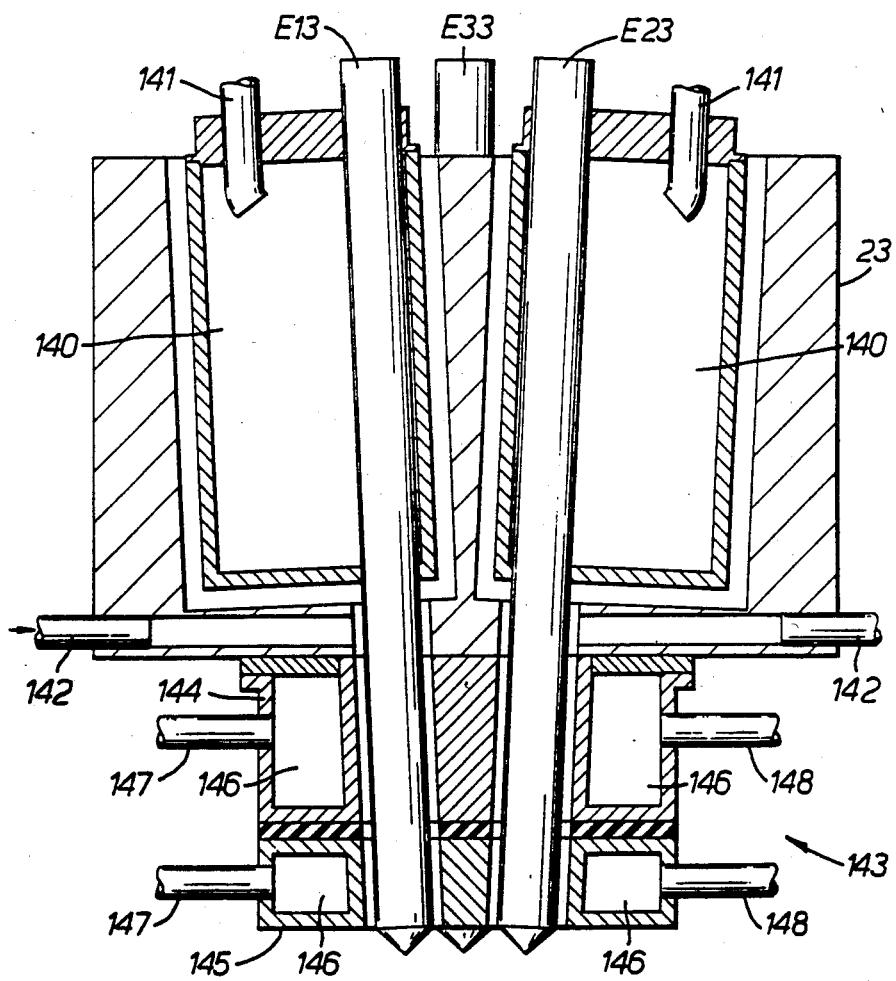
FIG. 17 is a sectional view along the lines X—X of the plasma torch of FIG. 16.

FIGS. 16 and 17 illustrate in a little more detail a plasma torch similar to that just described but with three electrodes E13, E23 and E33. The electrodes are each held in an electrode holder 23 and the upper portions of the electrodes cooled by water jackets 140 having water inlets 141 and outlets (not shown). Gas is supplied to each electrode through an inlet passage 142 and passes down through a nozzle assembly 143. The nozzle assembly 143 has an upper part 144 and a lower part 145 insulated from the upper part and defining the pilot arc electrode. The upper part 144 and the lower part 145 each have cooling water passages 146 with inlets 147 and outlets 148.

It will be understood that the power supply arrangement for the torch shown in FIGS. 16 and 17 is substantially the same as that for the torch shown in FIGS. 13 and 14 except that only three supplies are required instead of six.

Figure 18:
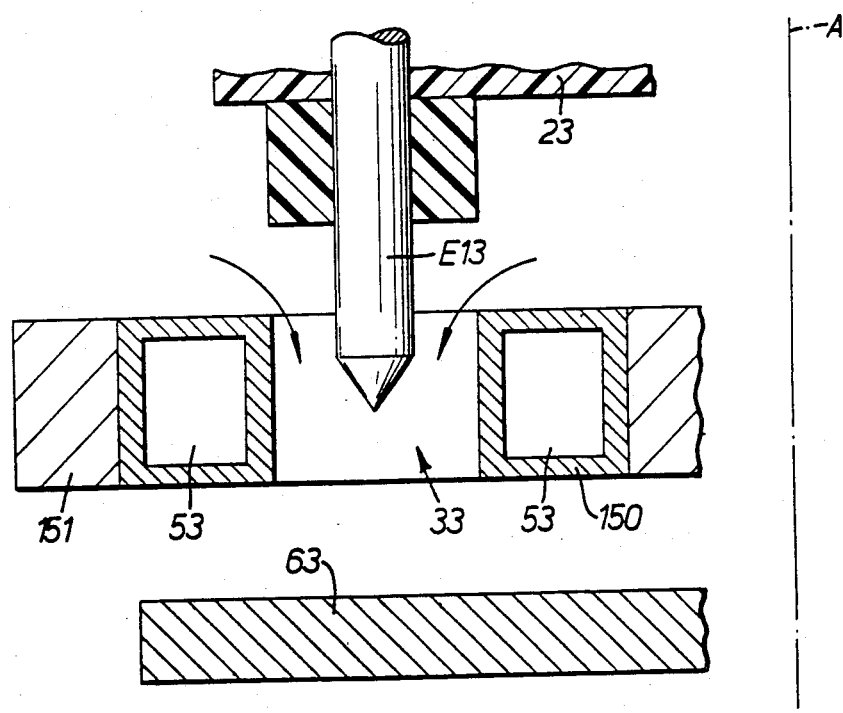
FIG. 18 is a sectional side view similar to FIG. 13 illustrating a modification that can be made to the plasma torch of FIGS. 13 and 14.

Although in the embodiments illustrated above the pilot electrode comprises a single member providing a pilot arc for each electrode, an alternative arrangement is that shown in FIG. 18 where a separate nozzle insert 150 is provided for each electrode E13, E23, etc. The nozzle inserts 150 are secured to a nozzle holder 151 and are electrically connected together.

In the example of torch described above the nozzle member has respective apertures for each electrode. Thus in FIG. 13 the member 43 has respective apertures for each electrode E13, E23 . . . E63 so that a separate nozzle is provided for each electrode. An alternative arrangement is that shown in FIG. 19 where a common nozzle 43 is provided around the outside of all the electrodes E13, E23 . . . E63.

In this respect it should be noted that whilst it is often a common feature of a conventional plasma torch that the nozzle is severely constricted this is not a necessary feature of the present invention. For very high operating temperatures, for example, 20,000° C. it is of course necessary to concentrate the heat generated by the discharge in a small volume but in many applications of the present invention it is the enthalpy generated by the torch that is important and the torch can be operated with a lower temperature output.

In the drawings the voltage supplies V13, V23 . . . V63 are shown completely separate from one another. It should be understood that the voltage supplies may for practical purposes be derived from a common power source provided that they are sufficiently electrically isolated from one another as to behave like separate supplies.

A plasma torch embodying the invention may be used in many different applications. The use of the torch in a furnace to produce steel has already been mentioned. The torch may also be used as a non-consumable electrode in a vacuum arc furnace, in the reduction of ferro alloys or in any other application where a high power plasma torch is required, for example cutting, welding or spraying.

The circuit arrangement of the torch may be such that the current flows in the discharges are not all in the same direction and discharges having opposing current flows repel each other. This would have the advantage of spreading the discharges.

What is claimed is:

1. A gas laser including a discharge tube, optical path means for providing an optical path in the discharge tube, a power supply, a first set of at least two adjacent electrodes extending into the discharge tube and a like number of first impedances each of which connects one electrode of the first set to one side of the power supply, and a second set of at least two adjacent electrodes spaced along the optical path from the first set and extending into the discharge tube and a like number of second impedances each of which connects one electrode of the second set to an opposite side of the power supply, whereby stable electric glow discharges which coalesce and extend along the optical path are generated between the respective electrodes of the first and second sets to provide a stable volume of electric discharge in the optical path of the laser for exciting the laser.

2. A gas laser in accordance with claim 1, in which the discharges are stable glow discharges.

3. A gas laser in accordance with claim 1 in which the power supply is a DC power supply.

4. A gas laser in accordance with claim 2 in which the electrodes receive their power from a DC power supply.

5. An apparatus as claimed in claim 1 in which the impedances are each above a minimum value of the same order of magnitude as the impedance of the discharge path during stabilized operation.

6. An apparatus as claimed in claim 1 in which the first impedances are of substantially the same value and the second impedances are also of substantially the same value.

7. An apparatus as claimed in claim 1 in which the value of the first impedances are the same as the value of the second impedances.

8. An apparatus as claimed in claim 1 including impedance adjusting means for adjusting the discharge currents.

9. An apparatus as claimed in claim 1 in which the adjusting means comprises means for adjusting the impedance of each of said first and second impedances.

10. An apparatus as claimed in claim 9 in which the adjusting means is arranged to adjust the impedance of each of the first impedances and each of the second impedances equally.

11. A laser as claimed in claim 1 in which the laser is a $CO_2$ gas laser.

12. A laser as claimed in claim 1 in which all the first and second impedances are of substantially the same value.

13. A method of enhancing laser action in the optical path of a gas discharge laser by generating two or more electric discharges extending between respective electrodes but coalescing intermediate their ends in the optical path, the method including the following steps:
   providing a first set of electrodes comprising two or more adjacent electrodes,
   providing a second set of electrodes comprising two or more adjacent electrodes spaced along the optical path from the first set,
   providing a separate impedance for each electrode,
   connecting each electrode of the first set through a respective separate impedance to a common source of a first potential, and
   connecting each electrode of the second set through a respective separate impedance to a common source of a second potential,
   the first and second set of electrodes being spatially arranged such that stable electric glow discharges which coalesce and extend along the optical path are generated between respective electrodes of the first and second sets.

14. A method as claimed in claim 13 in which one of the first and second potentials is earth potential.

* * * * *